United States Patent
Tarlinton et al.

(10) Patent No.: US 9,188,838 B1
(45) Date of Patent: Nov. 17, 2015

(54) COMPACT MULTI-RESOLUTION AERIAL CAMERA SYSTEM

(71) Applicant: NEARMAP AUSTRALIA PTY LTD., Sydney (AU)

(72) Inventors: Mark Harold Tarlinton, Marrickville (AU); David Arnold Bleads, Tennyson (AU); Paul Lapstun, Rodd Point (AU)

(73) Assignee: nearmap Australia Pty Ltd., Sydney (AU)

( * ) Notice: Subject to any disclaimer, the term of this patent is extended or adjusted under 35 U.S.C. 154(b) by 0 days.

(21) Appl. No.: 14/718,472

(22) Filed: May 21, 2015

Related U.S. Application Data

(63) Continuation of application No. 14/310,523, filed on Jun. 20, 2014, now Pat. No. 9,046,759.

(51) Int. Cl.
| | | |
|---|---|---|
| *G03B 15/00* | (2006.01) | |
| *G03B 37/00* | (2006.01) | |
| *G03B 37/04* | (2006.01) | |

(52) U.S. Cl.
CPC .............. *G03B 15/006* (2013.01); *G03B 37/04* (2013.01)

(58) Field of Classification Search
CPC ...... G03B 15/006; G03B 37/00; G03B 37/04; G03B 15/00; B64D 47/08; G01C 11/02
See application file for complete search history.

(56) References Cited

U.S. PATENT DOCUMENTS

| | | | |
|---|---|---|---|
| 1,735,109 A | 11/1929 | Eliel | |
| 1,797,849 A | 3/1931 | Aschenbrenner | |
| 2,665,481 A | 1/1954 | Henry | |
| 5,894,323 A | 4/1999 | Kain et al. | |
| 6,834,163 B2 | 12/2004 | Trunz et al. | |
| 7,899,311 B1 | 3/2011 | Kearney et al. | |
| 8,497,905 B2 | 7/2013 | Nixon | |
| 8,675,068 B2 | 3/2014 | Nixon | |
| 9,046,759 B1 * | 6/2015 | Tarlinton et al. | G03B 37/00 |
| 9,052,571 B1 * | 6/2015 | Lapstun et al. | G03B 39/00 |
| 2007/0188610 A1 | 8/2007 | Micotto et al. | |
| 2012/0200703 A1 | 8/2012 | Nadir et al. | |
| 2013/0235199 A1 | 9/2013 | Nixon | |
| 2014/0198211 A1 | 7/2014 | Giuffrida et al. | |

OTHER PUBLICATIONS

U.S. Appl. No. 13/873,818, filed Apr. 30, 2013, Nixon.
U.S. Appl. No. 14/310,523, filed Jun. 20, 2014, Tarlinton et al.
U.S. Appl. No. 14/478,380, filed Sep. 5, 2014, Lapstun et al.
U.S. Appl. No. 14/618,551, filed Feb. 10, 2015, Millin et al.
U.S. Appl. No. 14/687,544, filed Apr. 15, 2015, Lapstun et al.
Wolf, et al., Elements of Photogrammetry with Application in GIS, McGraw-Hill, 2000, pp. 383-390.
The Manual of Photogrammetry, Chapter 10, Analytical Photogrammetric Operations, Sixth Edition, American Society for Photogrammetry and Remote Sensing (ASPRS), pp. 860-885.
Triggs, et al., Bundle Adjustment—A Modern Synthesis, Lecture Notes in Computer Science, vol. 1882, Jan. 2000, 75 pages.

* cited by examiner

*Primary Examiner* — W B Perkey
(74) *Attorney, Agent, or Firm* — Oblon, McClelland, Maier & Neustadt, L.L.P.

(57) ABSTRACT

A system for capturing aerial images, the system comprising at least one overview camera, a plurality of detail cameras, and a frame for holding the cameras, each detail camera having a longer focal length than the at least one overview camera, each detail camera mounted at a different angle laterally so that the fields of view of the detail cameras overlap to form an extended lateral field of view, the frame comprising a center support, each side of the center support supporting at least some of the cameras.

20 Claims, 21 Drawing Sheets

COMPACT MULTI-RESOLUTION AERIAL CAMERA SYSTEM

CROSS-REFERENCE TO RELATED APPLICATIONS

This is a continuation of application Ser. No. 14/310,523, filed Jun. 20, 2014, the entire contents of which are incorporated herein by reference.

FIELD OF THE INVENTION

The present invention relates to aerial camera systems and efficient methods for creating photomosaics from aerial photos.

BACKGROUND OF THE INVENTION

Accurately georeferenced photomosaics of orthophotos are becoming popular alternatives to traditional pictorial maps because they can be created automatically from aerial photos, and because they show actual useful detail on the ground.

The creation of accurate photomosaics from aerial photos is well described in the literature. See, for example, Elements of Photogrammetry with Application in GIS, Fourth Edition (Wolf et al.), and the Manual of Photogrammetry, Sixth Edition (American Society for Photogrammetry and Remote Sensing (ASPRS)).

The creation of a photomosaic requires the systematic capture of overlapping aerial photos of the area of interest, both to ensure complete coverage of the area of interest, and to ensure that there is sufficient redundancy in the imagery to allow accurate bundle adjustment, orthorectification and alignment of the photos.

Bundle adjustment is the process by which redundant estimates of ground points and camera poses are refined. Modern bundle adjustment is described in detail in "Bundle Adjustment—A Modern Synthesis" (Triggs et al.).

Bundle adjustment may operate on the positions of manually-identified ground points, or, increasingly, on the positions of automatically-identified ground features which are automatically matched between overlapping photos.

Overlapping aerial photos are typically captured by navigating a survey aircraft in a serpentine pattern over the area of interest. The survey aircraft carries an aerial camera system, and the serpentine flight pattern ensures that the photos captured by the camera system overlap both along flight lines within the flight pattern and between adjacent flight lines.

Sufficient redundancy for accurate bundle adjustment typically dictates the choice a longitudinal (forward) overlap of at least 60%, i.e. between successive photos along a flight line, and a lateral (side) overlap of at least 40%, i.e. between photos on adjacent flight lines. This is often referred to as 60/40 overlap.

The chosen overlap determines both the required flying time and the number of photos captured (and subsequently processed). High overlap is therefore expensive, both in terms of flying time and processing time, and practical choices of overlap represent a compromise between cost and photomosaic accuracy.

The use of a multi-resolution camera system provides a powerful way to reduce overlap without excessively compromising accuracy. The capture and processing of multi-resolution aerial photos is described in U.S. Pat. Nos. 8,497,905 and 8,675,068 (Nixon), the contents of which are herein incorporated by cross-reference. Multi-resolution sets of photos allow photomosaic accuracy to be derived from the overlap between lower-resolution overview photos, while photomosaic detail is derived from higher-resolution detail photos.

U.S. Pat. Nos. 8,497,905 and 8,675,068 (Nixon) describe an external camera pod attachable to a small aircraft. An external pod has two key disadvantages: the pod is highly aircraft-specific, and space within the pod is constrained. An aircraft-specific pod limits the choice of aircraft and therefore limits operational parameters such as altitude range, and, conversely, requires significant design, testing and certification effort to adapt to different aircraft. Constrained space within the pod limits the size and therefore the focal length of camera lenses, which in turn limits the range of operating altitudes for a particular target image resolution.

SUMMARY OF THE INVENTION

In a first aspect, the present invention provides a system for capturing aerial images, the system comprising at least one overview camera, a plurality of detail cameras, and a frame for holding the cameras, each detail camera having a longer focal length than the at least one overview camera, each detail camera mounted at a different angle laterally so that the fields of view of the detail cameras overlap to form an extended lateral field of view, the frame attachable to the floor of an aircraft above a camera hole, thereby providing the cameras with a view of the ground below the aircraft through the camera hole.

The system may comprise an adapter plate attachable to the floor of the aircraft, the frame attachable to the adapter plate. For example, the adapter plate may attach to the floor by bolting to mounting points set into the floor, or it may attach to the floor by bolting to seat tracks attached to the floor.

Each detail camera may be angled inwards towards the center of the camera hole, thereby minimising the size of the camera hole required to accommodate the fields of view of the detail cameras.

The ratios of the focal lengths of the detail cameras to the focal length of the at least one overview camera may be between 4 and 8.

The focal lengths of the detail cameras may be between 85 mm and 800 mm. Each detail camera may utilise a stock lens with a focal length such as 85 mm, 105 mm, 135 mm, 180 mm, 200 mm, 300 mm, 400 mm, 500 mm, 600 mm, 700 mm, or 800 mm.

The focal length of the overview camera may be between 10 mm and 200 mm. The overview camera may utilise a stock lens with a focal length such as 10.5 mm, 14 mm, 16 mm, 18 mm, 20 mm, 21 mm, 24 mm, 28 mm, 35 mm, 40 mm, 45 mm, 50 mm, 55 mm, or 60 mm.

The system may comprise five detail cameras.

The detail cameras may have fixed-focus lenses focused at infinity, or variable-focus lenses and auto-focus mechanisms.

The overview camera has a fixed-focus lens focused at infinity, or a variable-focus lens and an auto-focus mechanism.

The system may comprise a computer system configured to automatically fire the detail cameras during flight such that successive detail photos overlap longitudinally.

The system may comprise at least one Global Navigation Satellite System (GNSS) receiver, the computer configured to receive and store position data from the at least one GNSS receiver in real time.

The system may comprise an IMU, the computer configured to receive and store orientation data from the IMU in real time.

The system may comprise a pilot display, the computer configured to provide flight instructions to the pilot via the cockpit display.

The system may comprise a stored flight plan, the computer configured to fire the cameras at a rate determined from the flight plan, the real-time position of the aircraft, and the real-time speed of the aircraft.

DRAWINGS

Figures

DRAWINGS

Reference Numerals

Figure 1:
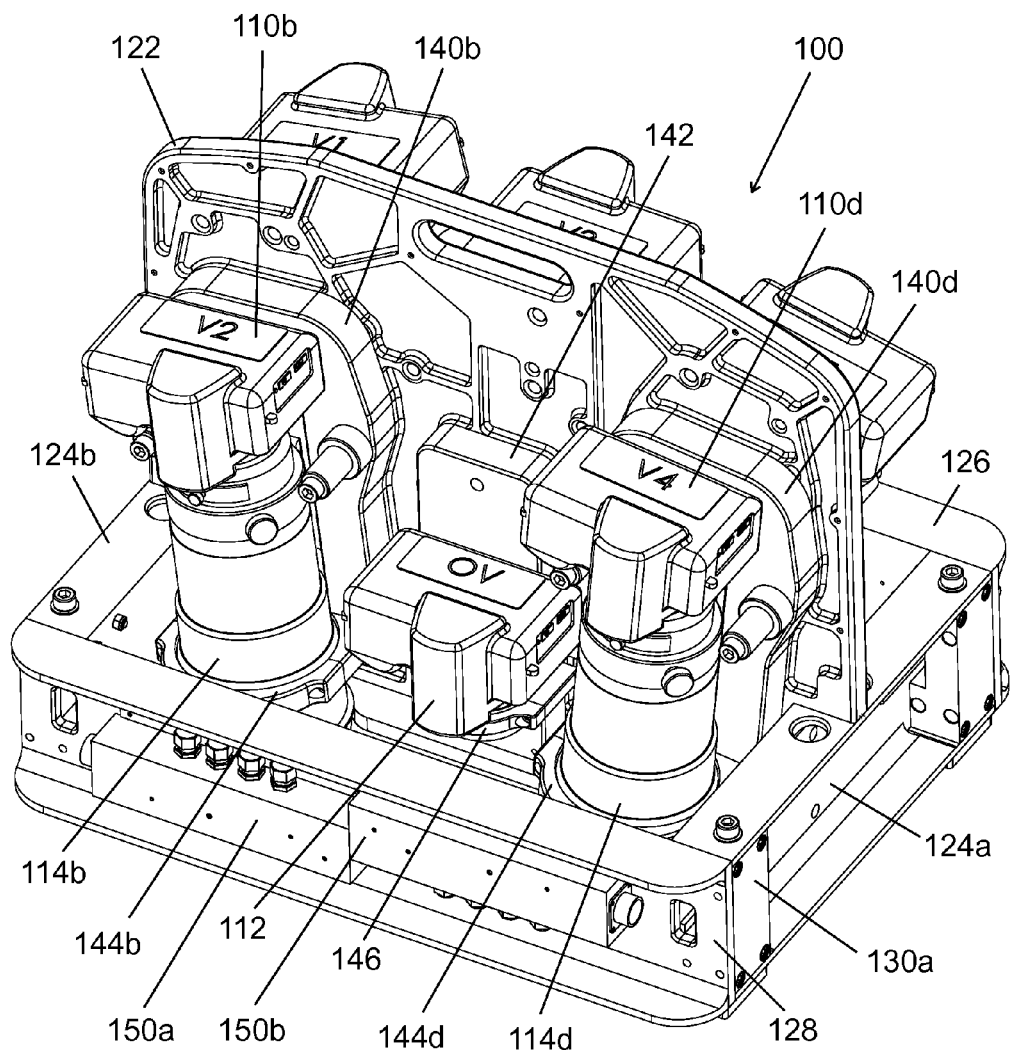
FIG. 1 shows a front view of the HyperCamera camera unit, i.e. facing forwards towards the front of the aircraft.
Figure 2:
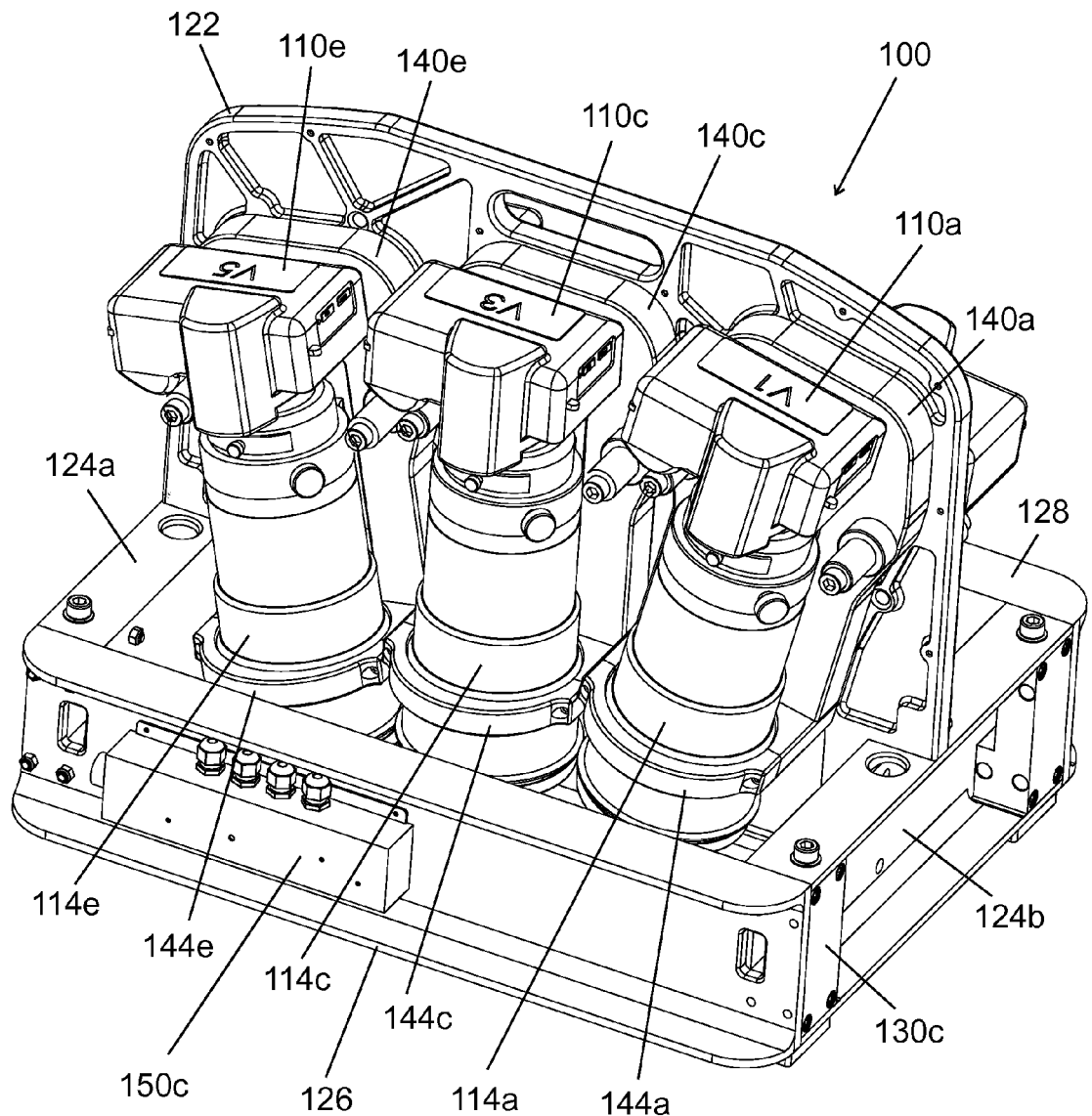
FIG. 2 shows a back view of the camera unit.
Figure 3:
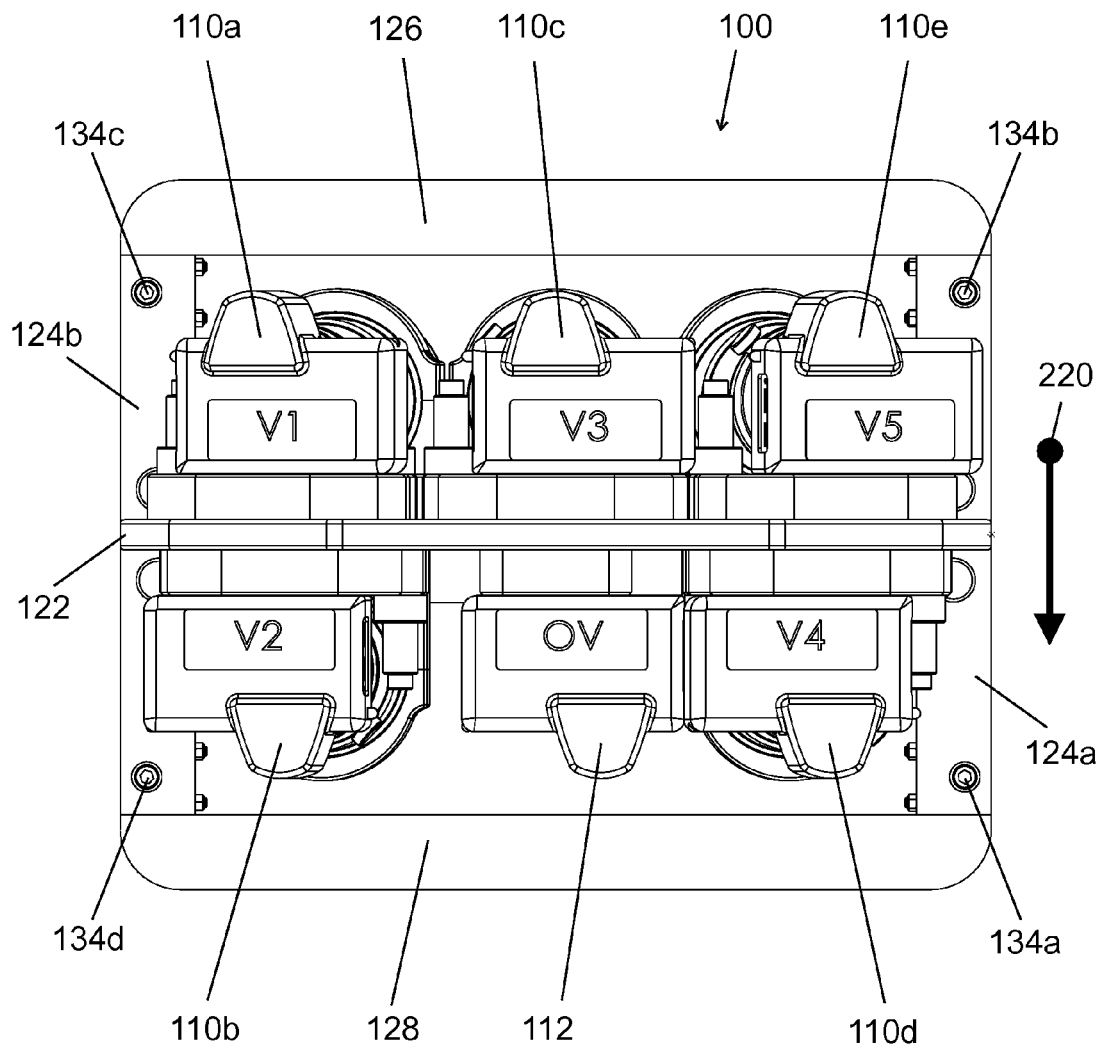
FIG. 3 shows a top view of the camera unit.
Figure 4:
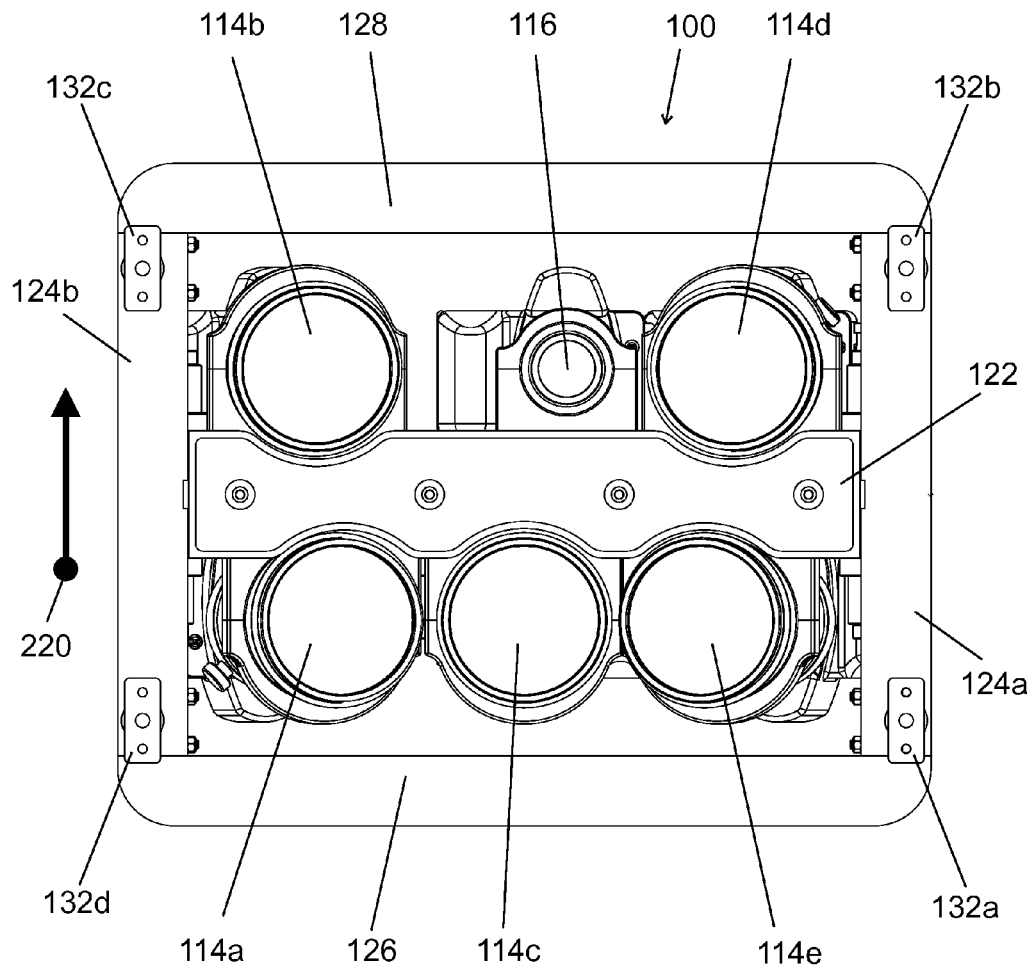
FIG. 4 shows a bottom view of the camera unit.
Figure 5:
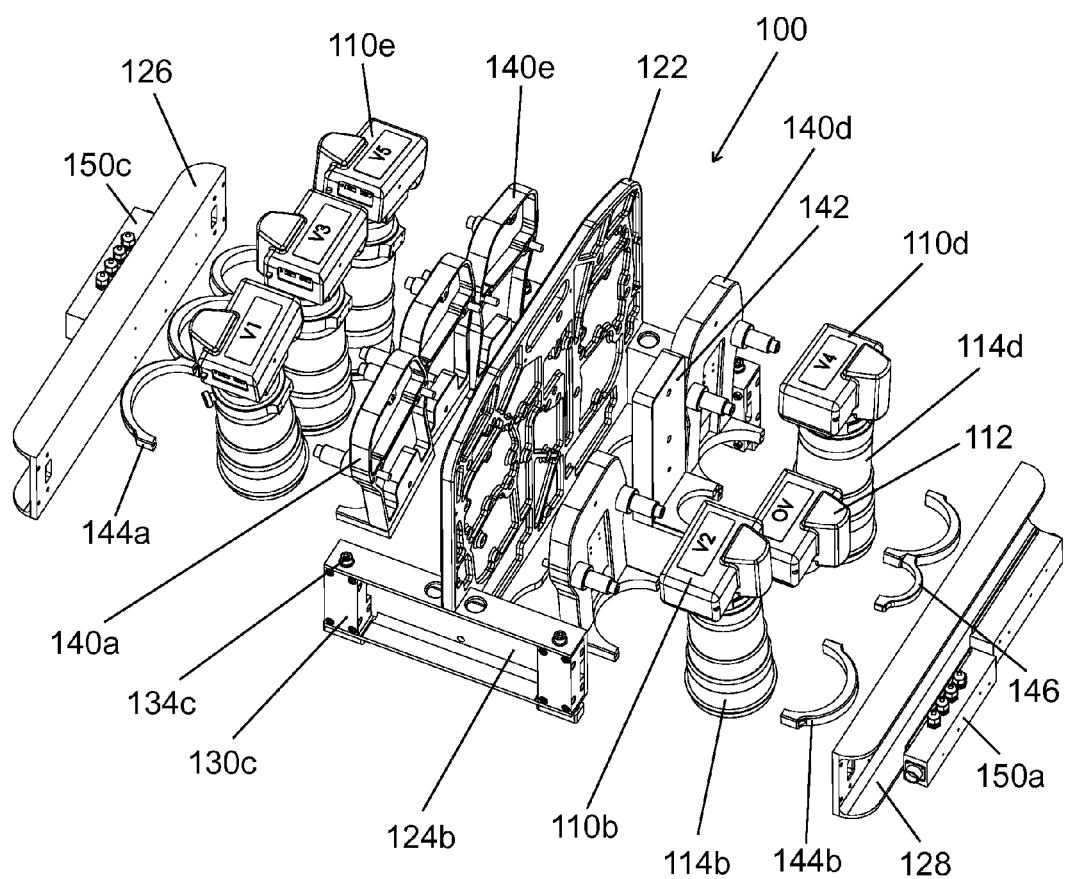
FIG. 5 shows an exploded view of the camera unit.

100 Camera unit.
110 Detail camera.
112 Overview camera.
114 Detail camera lens.
116 Overview camera lens.
120 Frame.
122 Frame center support.
124 Frame side support.
126 Frame rear support.
128 Frame front support.
130 Mount point block.
132 Mount point.
134 Mount bolt.
140 Mount for detail camera.
142 Mount for overview camera.
144 Clamp for detail camera lens.
146 Clamp for overview camera lens.
150 Power and control distribution box.
160 Detail field of view.
162 Lateral detail field of view.
164 Longitudinal detail field of view.
170 Overview field of view.
172 Lateral overview field of view.
174 Longitudinal overview field of view.
180 Aggregate detail field of view.
182 Lateral aggregate detail field of view.
200 Adapter plate.
202 Seat track fastener.
210 Aircraft floor.
212 Camera hole.
214 Seat track.
216 Adapter plate aperture.
220 Direction of flight.
222 Flight path.
224 Shot position.
230 Aerial survey aircraft.
300 Computer.
302 Pilot display.
304 Inertial Measurement Unit (IMU).
306 Global Navigation Satellite System (GNSS) receiver.
308 Analog-to-digital converters (ADCs).
310 Camera control unit (CCU).
320 Battery unit.
322 Aircraft auxiliary power.
324 Ground power unit (GPU).
400 Detail photos.
402 Overview photos.
404 Photomosaic.
410 Match features step.
412 Solve pose and positions step.
414 Orthorectify step.
416 Blend step.

DETAILED DESCRIPTION OF PREFERRED EMBODIMENTS

The HyperCamera™ is a compact multi-resolution aerial camera system suitable for easy deployment in a wide range of aircraft, large and small. It is designed to be installed above a standard 20-inch camera hole, as is often provided through the floor of a survey aircraft or airborne pod.

In a preferred embodiment, as illustrated in FIGS. 1 through 5, the HyperCamera comprises a camera unit 100 incorporating five detail cameras 110 and a relatively wider-angle overview camera 112. Each detail camera 110 has a detail lens 114, and the overview camera 112 has a overview lens 116.

The overview lens 116 is characterised by having a significantly wider angle than the detail lens 114. While it may be a true wide-angle lens, it may also be a normal lens or even a telephoto lens so long as it is significantly wider than the detail lens 114. Likewise, while the detail lens 114 may be a true telephoto lens, it may also be a normal lens or even a wide-angle lens so long as it is significantly narrower than the overview lens 116.

The cameras 110 and 112 are commercial off-the-shelf (COTS) digital SLR (DSLR) cameras. The use of COTS cameras allows the system to be readily adapted to the latest and best available cameras.

High-resolution COTS cameras are available with typical pixel counts ranging from 24 Mpixels to 36 Mpixels, from vendors such as Nikon and Canon. The 36 Mpixel Nikon D800 DSLR camera is a particularly good choice for the present system.

DSLR cameras offer a wide range of high-quality lenses, allowing the system to be readily configured to operate at different altitudes and resolutions.

The system is readily adapted to a mixture of cameras. For example, a relatively more expensive camera with a higher pixel count may be employed as the overview camera. 70 Mpixel DSLR cameras are expected to be available in the near future, and a 70 Mpixel camera would be a good choice for the overview camera.

In the preferred embodiment the detail lenses 114 of the detail cameras 110 all have the same focal length, and the detail cameras 110 all have the same pixel size. Thus the camera unit 100 embodies two distinct camera resolutions—overview and detail. This is readily extended to multiple resolutions greater than two through the use detail lenses 114 with different focal lengths, and/or the use of detail cameras 110 with different pixel sizes. The camera unit 100 may also incorporate multiple overview cameras with different resolutions.

Each detail lens 114 and overview lens 116 may be a fixed-focus lens focused at infinity or a variable-focus lens. In the latter case the corresponding camera 110 and/or 112 incorporates an auto-focus mechanism.

Each detail camera 110 is bolted to a camera mount 140, which in turn is bolted to a center support 122. Each detail camera lens 114 is further secured by a clamp 144 which is bolted to the detail camera mount 140.

The overview camera is bolted to a camera mount 142, which in turn is bolted to the center support 122. The overview camera lens 116 is further secured by a clamp 146 which is bolted to the overview camera mount 142.

The camera mounts 140 and 142 isolate much of the structure of camera unit 100 from the specifics of individual camera models and lens sizes.

The center support 122 is attached to a pair of side supports 124a and 124b, and each side support 124 is in turn attached to a rear support 126 and a front support 128 to form a rigid frame 120.

Each side support 124 is attached to mount point block 130 via a set of four bolts, and the mount point block 130 is in turn attached to the rear support 126 or front support 128, as appropriate, via a further set of four bolts. The mount point blocks 130 thereby provide the attachment mechanism between the side supports 124 and the rear and front supports 126 and 128.

Each of the side supports 124 and the rear and front supports 126 and 128 has a C-shaped cross-sectional profile to minimise weight while maximising rigidity, while the center support 122 is pocketed to minimise weight while maximising rigidity.

Each mount point block 130 is solid, and serves the additional purpose of providing a point of attachment between the camera unit 100 and a survey aircraft, as described below.

All parts are made from light-weight aluminium, except for fasteners which are made from steel.

The rear support 126 and the front support 128 hold three power and control distribution boxes 150. Each box 150 distributes power and control signals to a pair of cameras. For clarity, the power and control cabling between the boxes 150 and the cameras 110 and 112 is omitted in the figures.

In the preferred embodiment each detail camera 110 has a lens 114 with a focal length of 300 mm suitable for high-resolution imaging at relatively high altitudes. For example, when using a 36 Mpixel Nikon D800 camera (which has 4.88 um pixels), a 300 mm lens allows a ground sampling distance (GSD) of 10 cm at 20,000 feet, 8 cm at 16,000 feet, 6 cm at 12,000 feet, 4 cm at 8,000 feet, 2 cm at 4,000 feet, and so on.

Assuming the detail cameras 110 and overview camera 112 have similar pixel counts and pixel sizes, the overview camera 112 ideally has a lens 116 with a focal length that is between 4 and 8 times shorter than the focal length of the detail lens 114, as discussed further below. I.e. for a 300 mm detail lens 114, suitable focal lengths for the overview lens 116 range from about 40 mm to 75 mm. For illustrative purposes the present system utilises a 50 mm overview lens 116.

Figure 6:
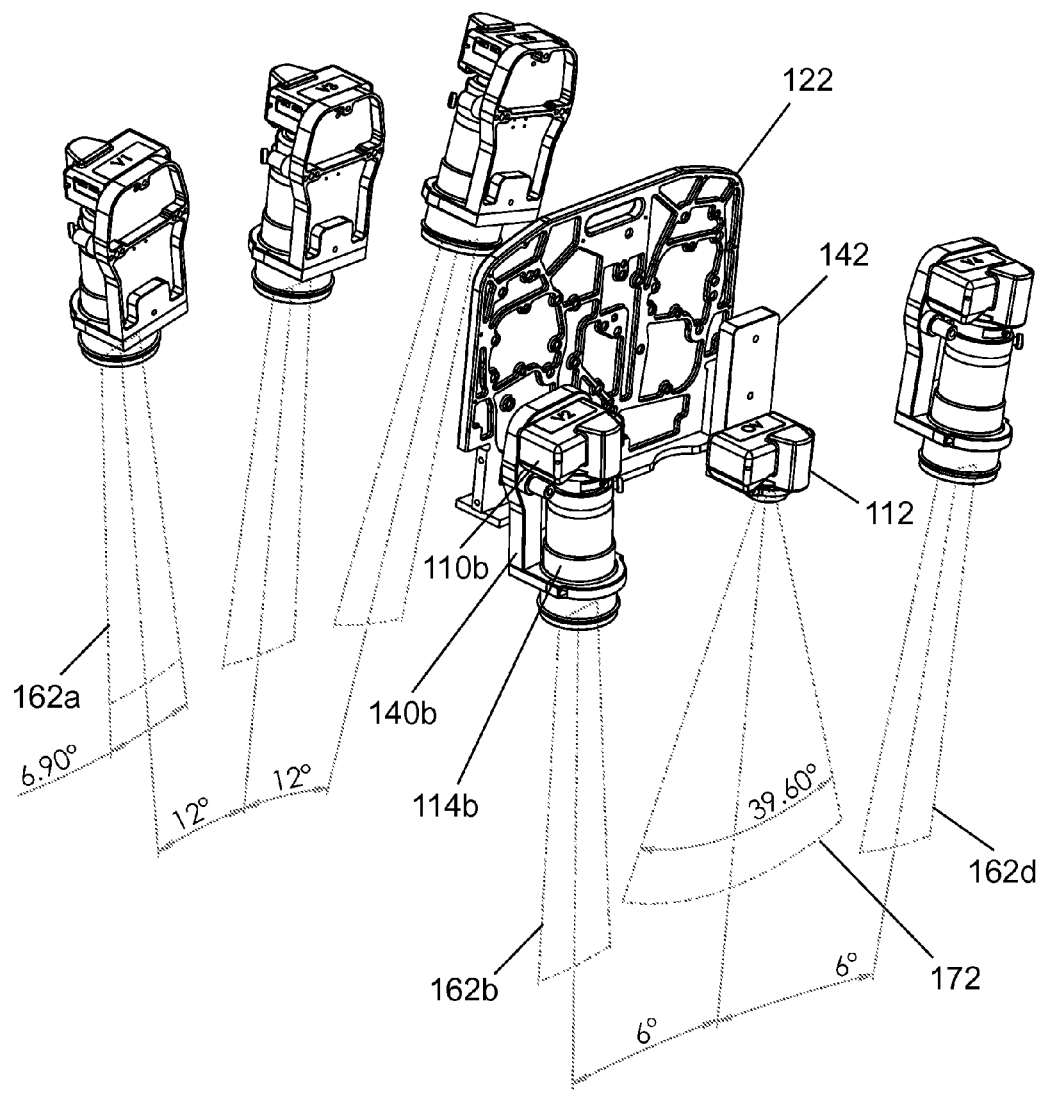
FIG. 6 shows an exploded view of the cameras and the central support of the camera unit, with the field of view of each camera.

FIG. 6 shows the 6.90-degree lateral field of view 162 of each of the five detail cameras 110 with 300 mm lenses 114, and the 39.60-degree lateral field of the overview camera 112 with a 50 mm lens 116.

In this specification, the lateral direction is the direction perpendicular to the direction of flight 220, and the longitudinal direction is the direction parallel to the direction of flight 220.

As shown, the detail cameras are angled 6 degrees apart laterally, i.e. slightly less than their 6.90-degree fields of view 162, so that the fields of view 162 overlap slightly.

Using 36 Mpixel Nikon D800 cameras, the five detail cameras 110 have an aggregate field of view with a pixel count of approximately 160 Mpixels, i.e. excluding overlap.

Stock telephoto lenses suitable for use as detail lenses 114 are available in a variety of focal lengths, typically including 85 mm, 105 mm, 135 mm, 180 mm, 200 mm, 300 mm, 400 mm, 500 mm, 600 mm, 700 mm, and 800 mm.

At 20,000 feet a 400 mm lens on a Nikon D800 camera allows a GSD of 7.4 cm, a 600 mm lens a GSD of 5.0 cm, and an 800 mm lens a GSD of 3.7 cm.

Stock normal and wide-angle lenses suitable for use as an overview lens 116 are available in a variety of focal lengths, typically including 10.5 mm, 14 mm, 16 mm, 18 mm, 20 mm, 21 mm, 24 mm, 28 mm, 35 mm, 40 mm, 45 mm, 50 mm, 55 mm, 60 mm and 70 mm.

The camera unit 100 is readily adapted for different models and sizes of cameras 110 (and 112) and lenses 114 (and 116) via different camera mounts 140 (and 142) and clamps 144 (and 146). For extremely long lenses a taller center support 122 can be used.

Figure 7:
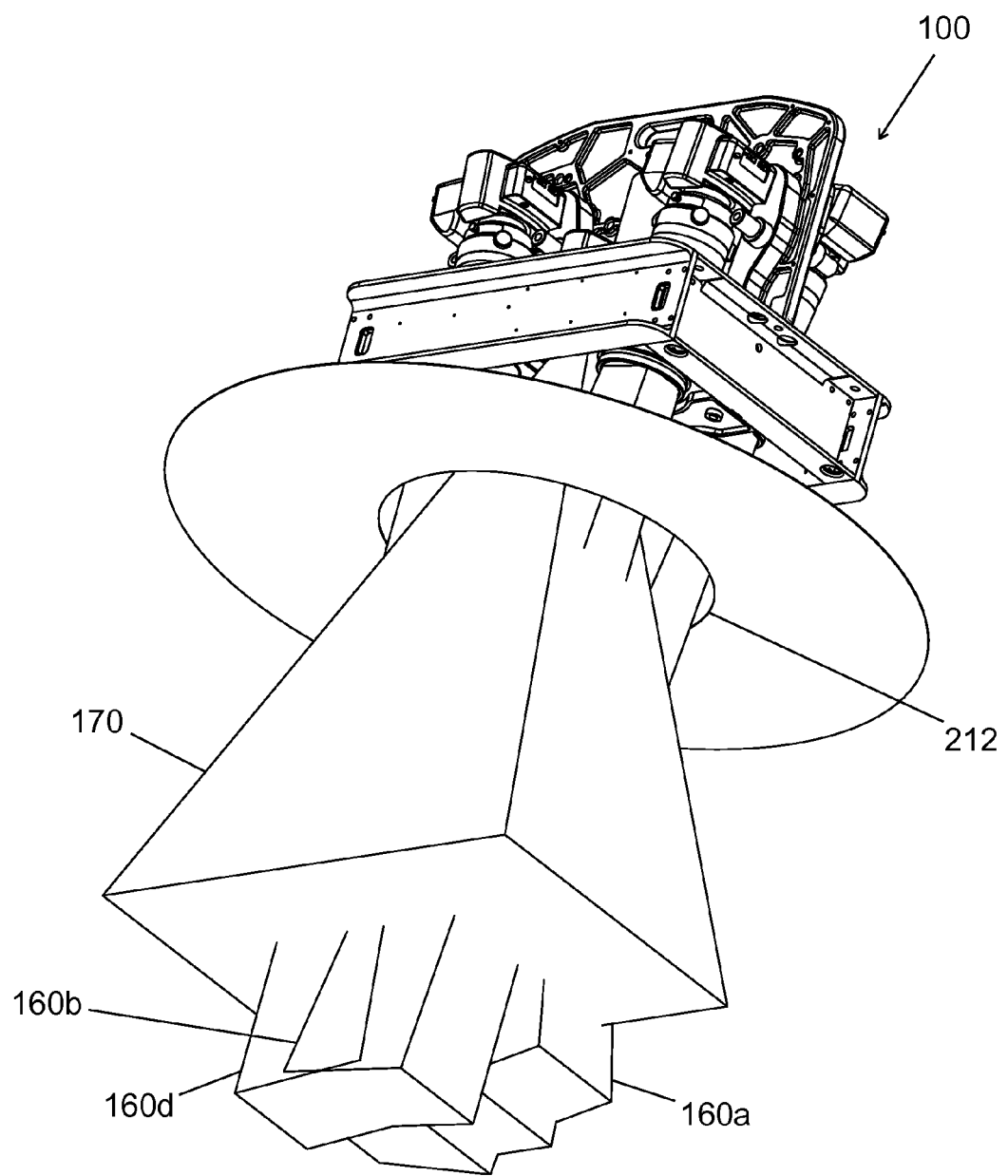
FIG. 7 shows the camera unit from below, with its combined fields of view passing through the aperture of an aircraft camera hole.

As shown in FIG. 6 and FIG. 7, the detail cameras are angled inwards so that their fields of view 162 cross over directly below the camera unit 100, creating a waist of minimum diameter where the fields of view pass through the camera hole 212. This makes the camera unit 100 compatible with standard 20-inch camera holes, as well as camera holes as small as about 17 inches.

Figure 8:
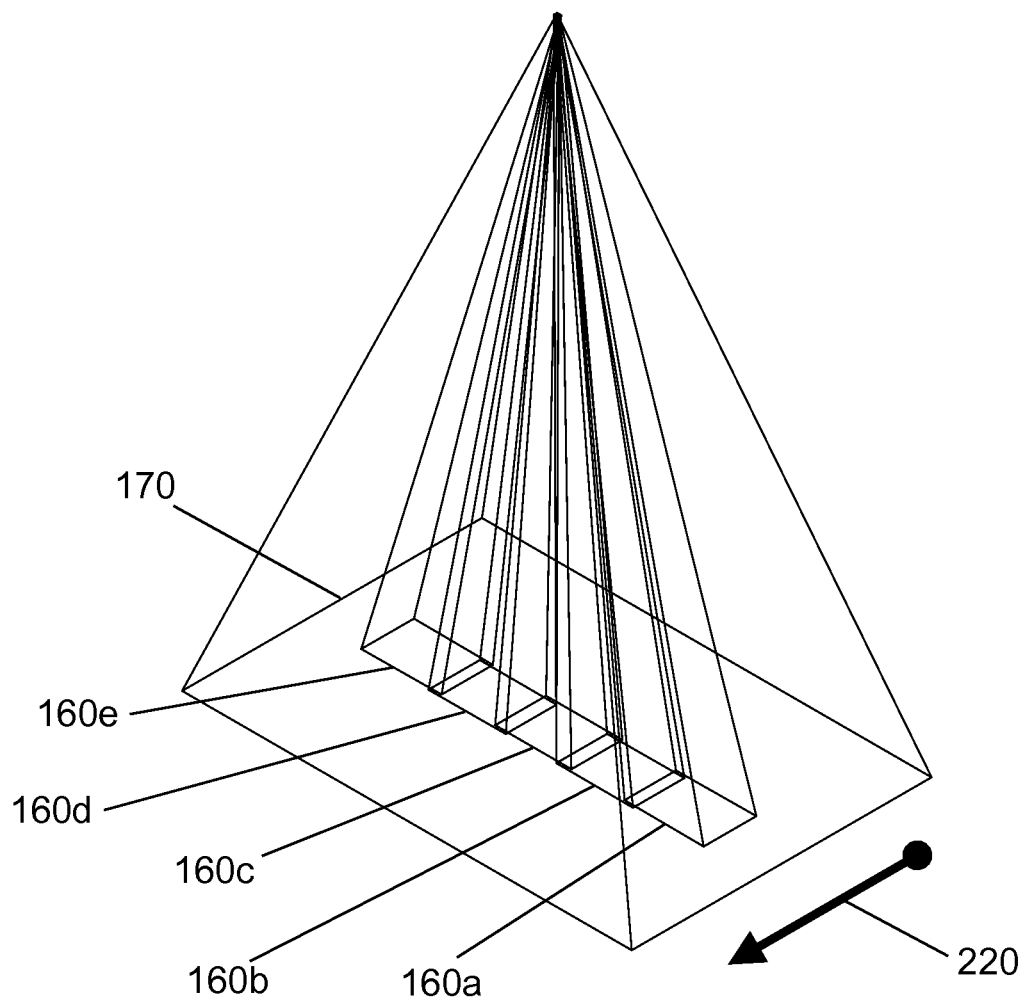
FIG. 8 shows the overview field of view and the five overlapping detail fields of view of the camera unit.

FIG. 8 shows the projection of the three-dimensional fields of view 160 and 170 of the detail cameras 110 and overview camera 112 onto a ground plane. It shows how the detail field of views 160 overlap in a direction perpendicular to the direction of flight 220.

Figure 9:
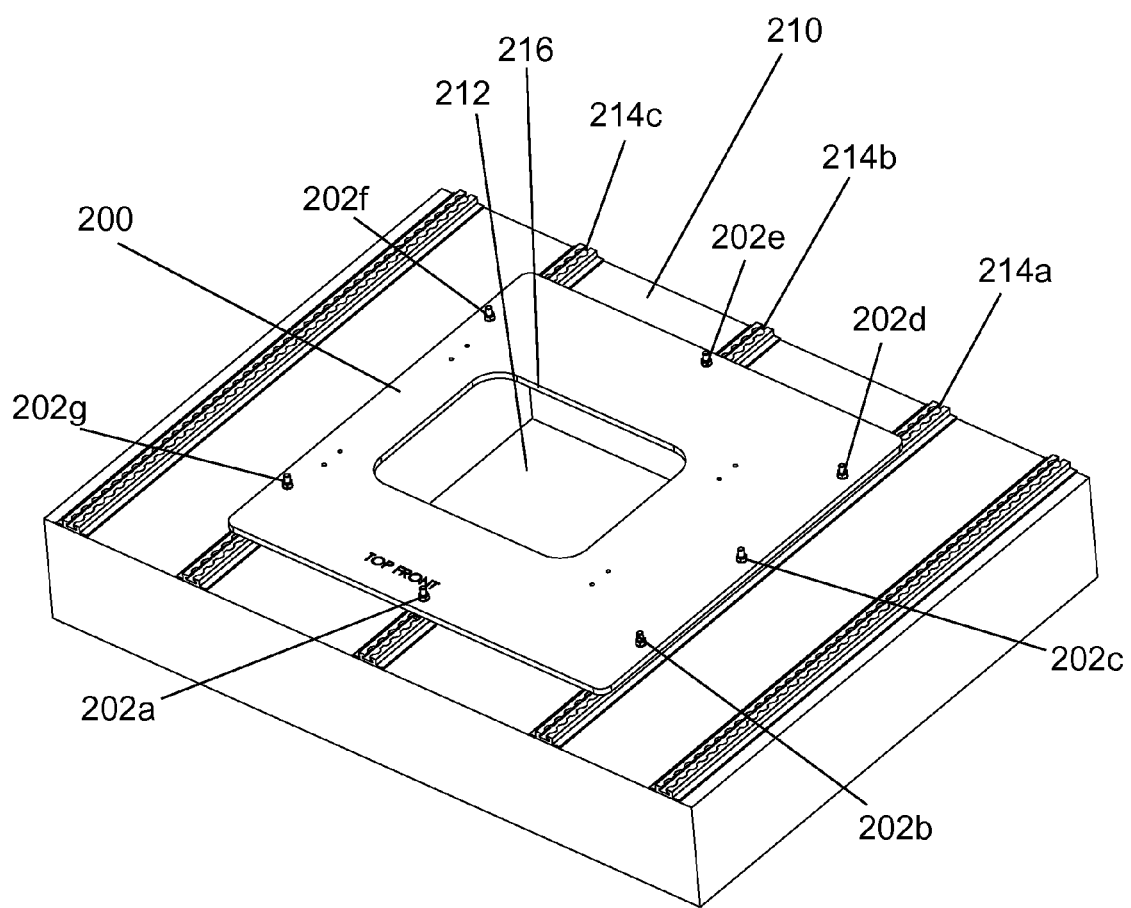
FIG. 9 shows the adapter plate of the HyperCamera mounted on seat tracks on the floor of an aircraft.

FIG. 9 shows an adapter plate 200 that attaches to the seat tracks 214 of an aircraft, a Cessna 208 in this case, via standard seat track fasteners 202. The adapter plate has an aperture 216 which exposes a camera hole 212 through the floor 210 of the aircraft.

Figure 10:
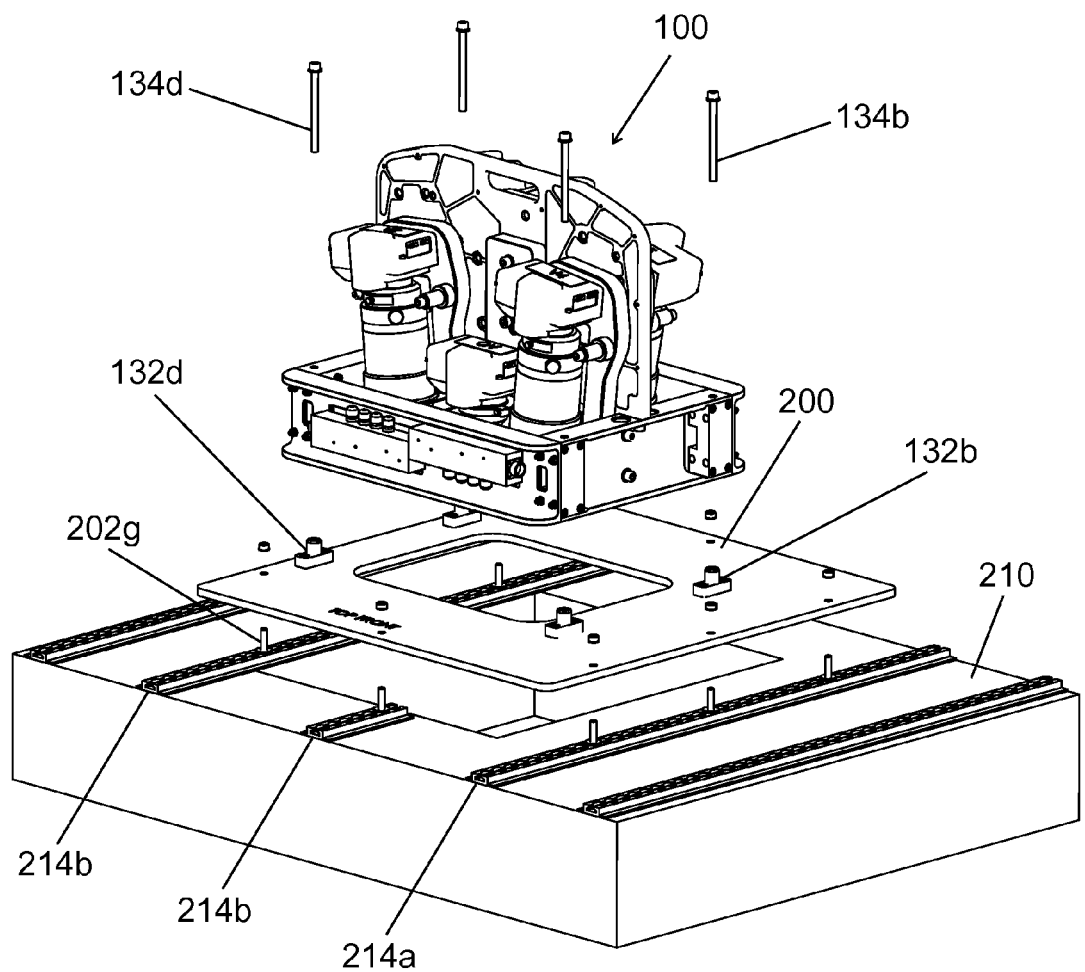
FIG. 10 shows an exploded view of the camera unit, the adapter plate, and seat tracks on the floor of an aircraft.

FIG. 10 shows an exploded view of the camera unit 100, adapter plate 200, and the aircraft floor 210. The adapter plate 200 is designed to attach the camera unit 100 to a particular aircraft, and isolates the design of the camera unit 100 from aircraft specifics. A different adapter plate is designed for each aircraft attachment variation, e.g. due to different seat track spacings, or because the aircraft's camera hole installation includes its own mounting points.

Four mount points 132 are bolted to the adapter plate, with each mount point 132 mating with a recess in the base of its corresponding mount point block 134. A mount bolt 143 securely attaches each mount point block 134 to its corresponding mount point 132, thus attaching the camera unit 100 to the adapter plate 200.

The adapter plate 200 allows the camera unit 100 to be easily installed in and subsequently removed from an aircraft via installation and removal of the four mount bolts 143. The adapter plate 200 is itself generally easily installed in and removed from an aircraft, requiring no modification to the aircraft (assuming a suitable camera hole is already installed). The installation of external camera pod is generally a much more complicated operation.

Figure 11:
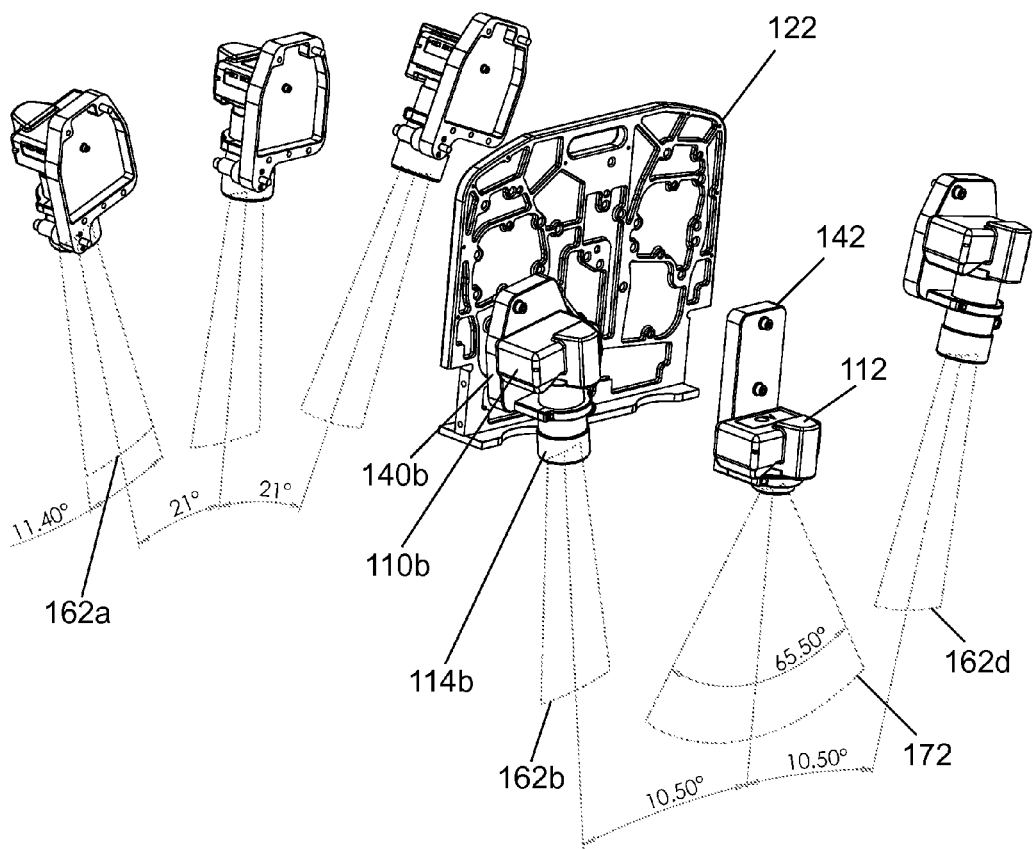
FIG. 11 shows an exploded view of the cameras and the central support of a wider-angle version of the camera unit.

FIG. 11 shows a variant of the camera unit 100 that utilises shorter 180 mm lenses 114 for the detail cameras 110, and a matching 28 mm lens 116 for the overview camera 112.

When using a 36 Mpixel Nikon D800 camera (which has 4.88 um pixels), a 180 mm lens allows a ground sampling distance (GSD) of 9.9 cm at 12,000 feet, 8.3 cm at 10,000 feet, 6.6 cm at 8,000 feet, 5 cm at 6,000 feet, 3.3 cm at 4,000 feet, and so on.

FIG. 11 shows the 11.40-degree lateral field of view 162 of each of the five detail cameras 110 with 180 mm lenses 114, and the 65.50-degree lateral field of view of the overview camera 112 with a 28 mm lens 116.

As shown, the detail cameras are angled 10.50 degrees apart laterally, i.e. slightly less than their 11.40-degree fields of view 162, so that the fields of view 162 overlap slightly.

Figure 12:
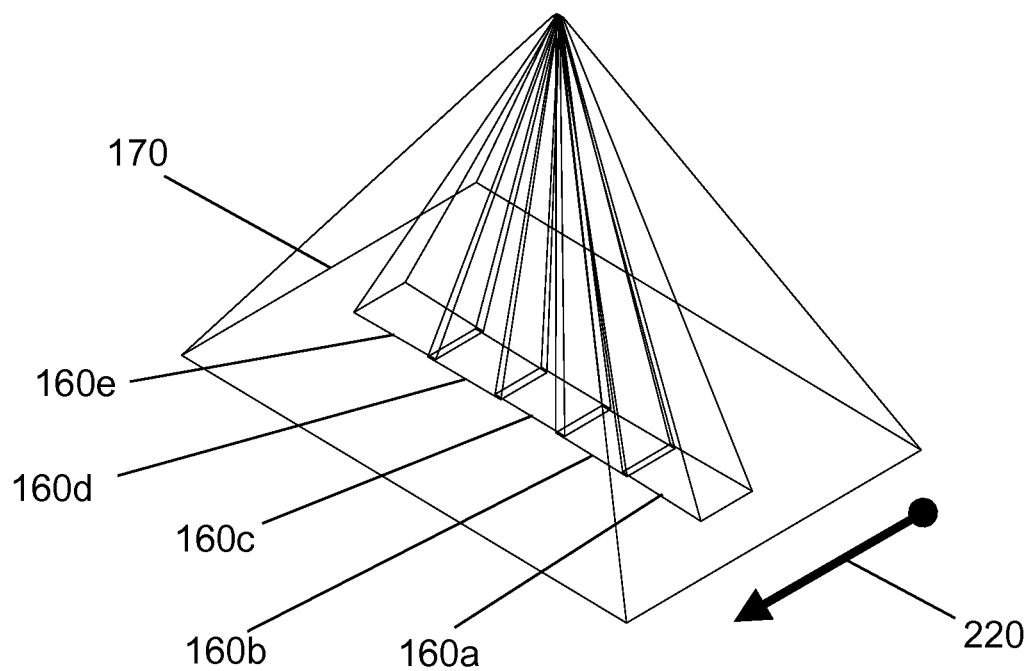
FIG. 12 shows the overview field of view and the five overlapping detail fields of view of the wider-angle version of the camera unit.

FIG. 12 shows the projection of the three-dimensional fields of view 160 and 170 of the detail cameras 110 and overview camera 112 of FIG. 10 onto a ground plane. It shows how the detail field of views 160 overlap in a direction perpendicular to the direction of flight 220, and how the wider fields of view associated with the shorter lenses leads to a lower operational altitude for the same footprint on the ground, i.e. in comparison to FIG. 8.

Figure 13:
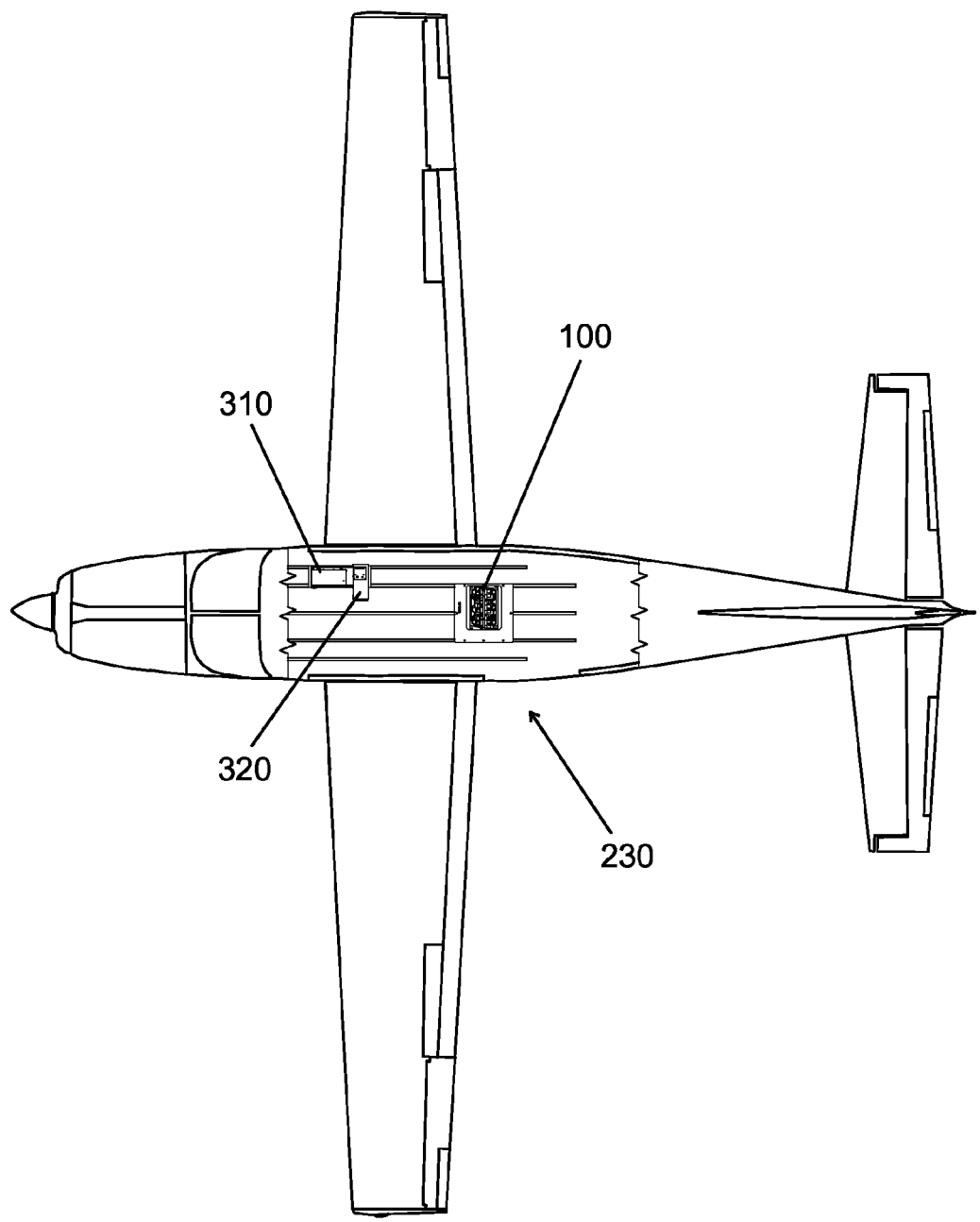
FIG. 13 shows a plan view of the HyperCamera installed in a Cessna 208 aircraft.
Figure 14:
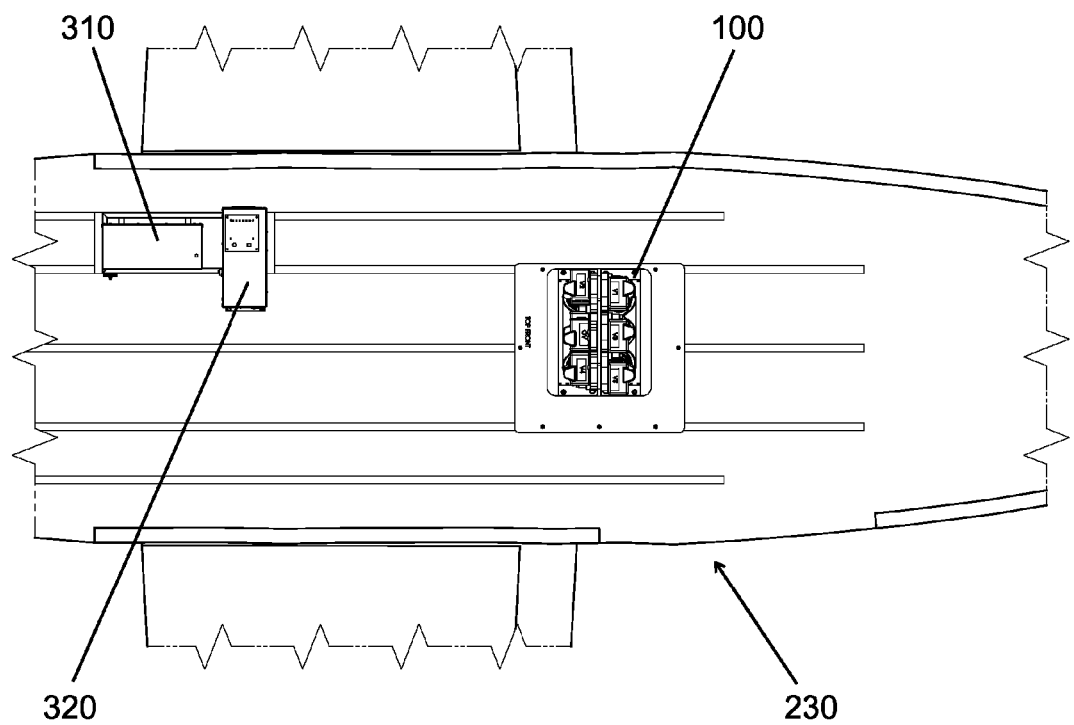
FIG. 14 shows a detailed plan view of the HyperCamera installed in a Cessna 208 aircraft.

FIG. 13 and FIG. 14 show plan views of a Cessna 208 survey aircraft 230 carrying a camera unit 100 installed centrally over a camera hole. The figures also show a camera control unit 310 (CCU) and battery unit 320 used to control and power the camera unit 100. These are described in more detail below. For clarity, the cabling connecting the CCU 310, battery unit 320 and camera unit 100 is omitted.

Figure 15:
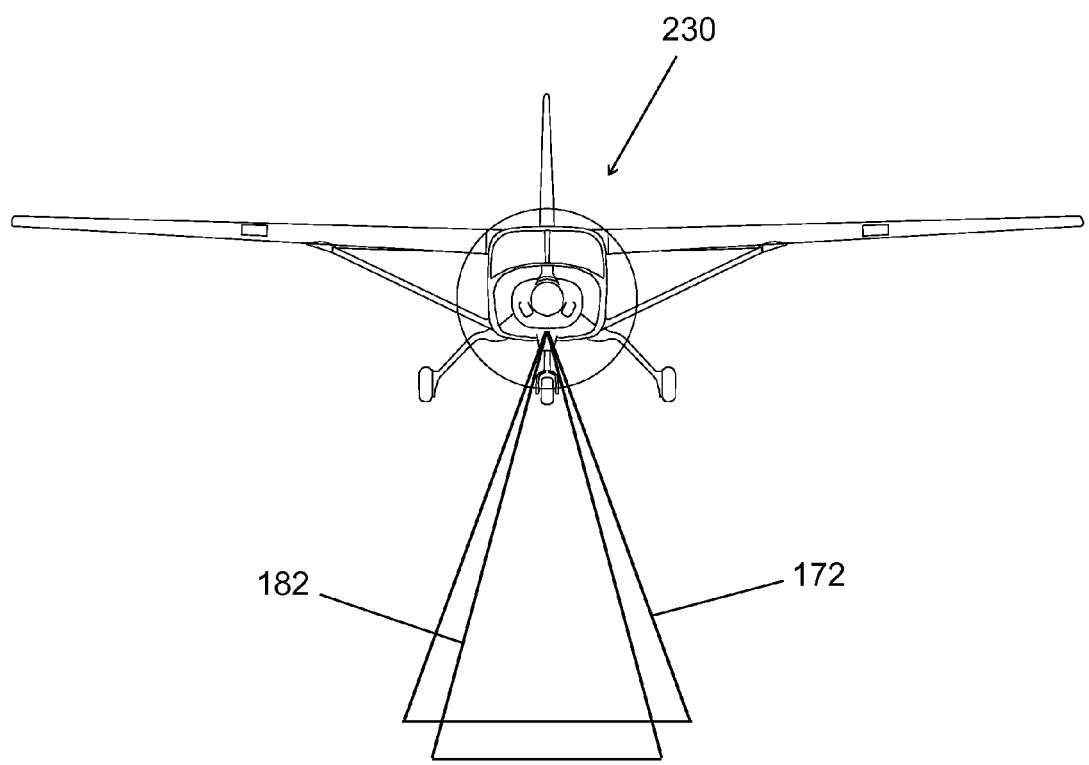
FIG. 15 shows a front elevation of a Cessna 208 aircraft carrying a HyperCamera, and the resultant overview and aggregate detail fields of view.

FIG. 15 shows a front elevation of the Cessna 208 survey aircraft 230 carrying a HyperCamera, and shows the lateral overview field of view 172 of the camera unit 100, and the aggregate lateral detail field of view 182 of the camera unit 100. The aggregate lateral detail field of view 182 is the aggregate of the five individual overlapping lateral detail fields of view 162.

Figure 16:
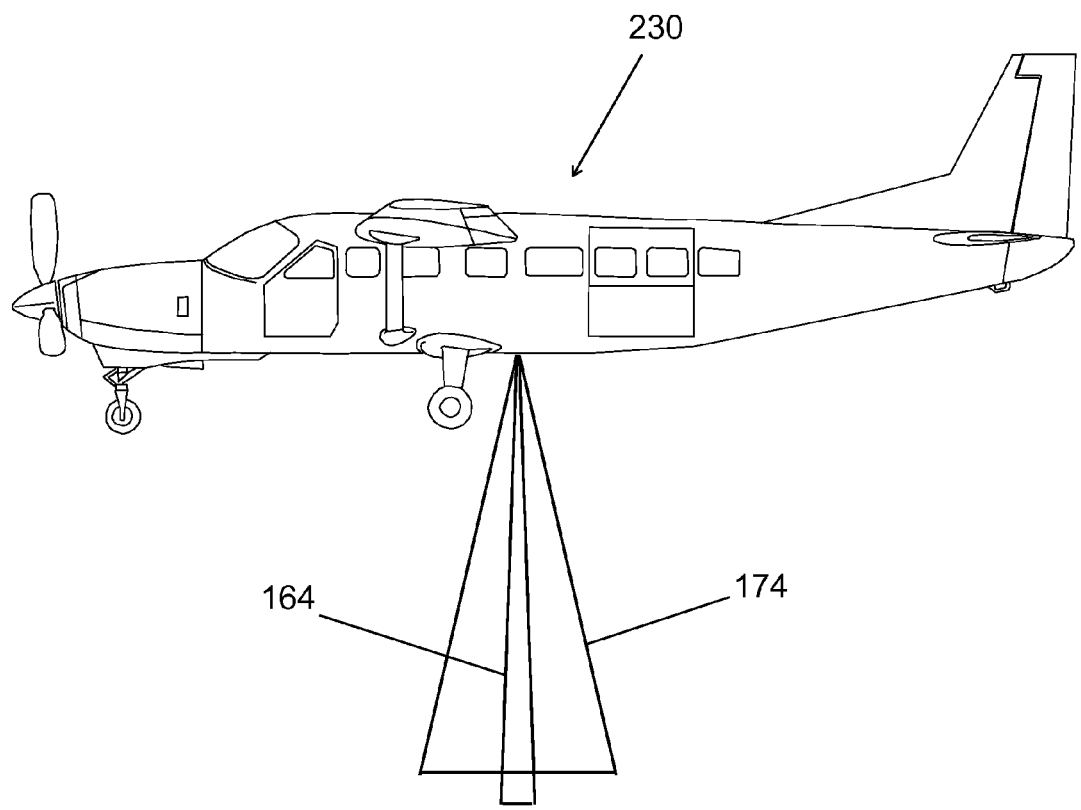
FIG. 16 shows a side elevation of a Cessna 208 aircraft carrying a HyperCamera, and the resultant overview and aggregate detail fields of view.

FIG. 16 shows a side elevation of the Cessna 208 survey aircraft 230 carrying a HyperCamera, and shows the longitudinal overview field of view 174 of the camera unit 100, and the longitudinal detail field of view 164 of the camera unit 100.

Figure 17:
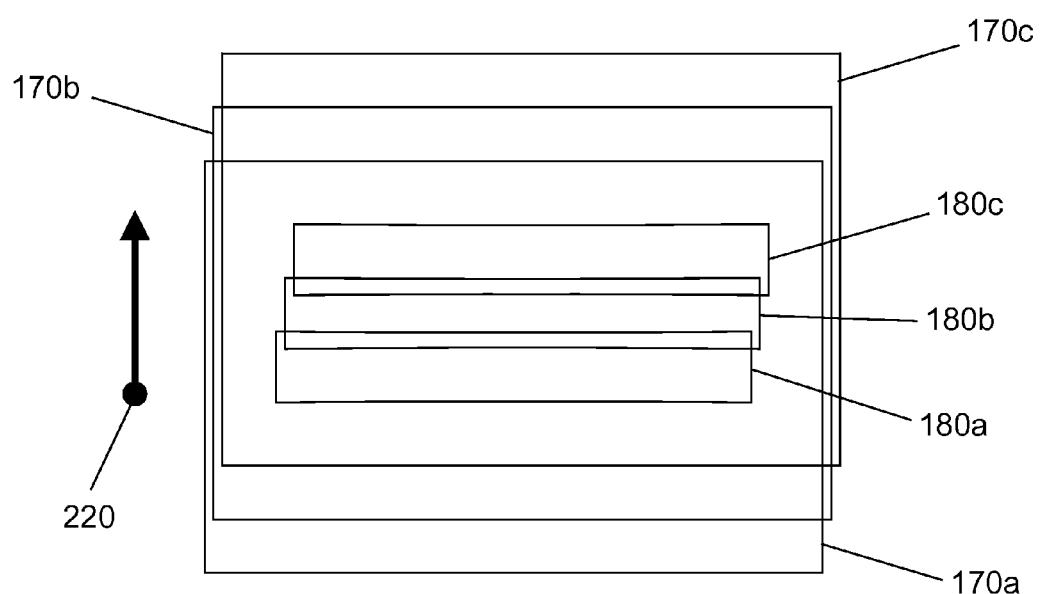
FIG. 17 shows the overlapping fields of view of three successive shots.

FIG. 17 shows the overlapping overview fields of view 170 and aggregate detail fields of view 180 of three successive shots in the direction of flight 220. The aggregate detail field of view 180 is the aggregate of the five individual overlapping detail fields of view 160. At the camera firing rate illustrated in the figure (i.e. as implied by the longitudinal overlap), the aggregate detail fields of view 180 overlap by about 20% longitudinally, while the overview fields of view 170 overlap by about 85% longitudinally.

Figure 18:
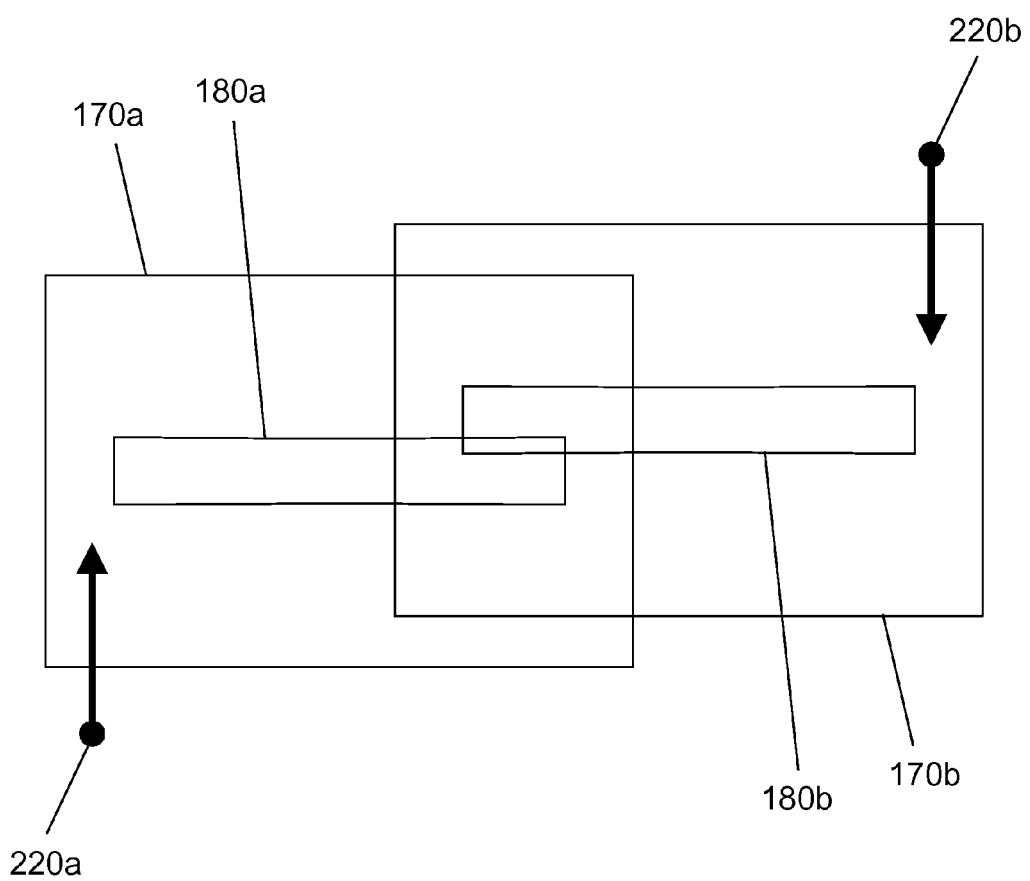
FIG. 18 shows the overlapping fields of view of shots in adjacent flight lines.

FIG. 18 shows the overlapping overview fields of view 170 and aggregate detail fields of view 180 of two shots from adjacent flight lines, i.e. flown in opposite directions 220. At the flight-line spacing illustrated in the figure, the aggregate detail fields of view 180 overlap by between 20% and 25% laterally, while the overview fields of view 170 overlap by about 40% laterally.

Assuming the detail cameras 110 and the overview camera 112 have similar pixel counts and pixel sizes, the size of the lateral overview field of view 172 and the size of the lateral aggregate detail field of view 182 are similar when the ratio of the focal length of the detail camera lens 114 to the focal length of the overview camera lens 116 is about 6, and useful lens combinations can be chosen with focal length ratios between about 4 and 8.

Figure 19:
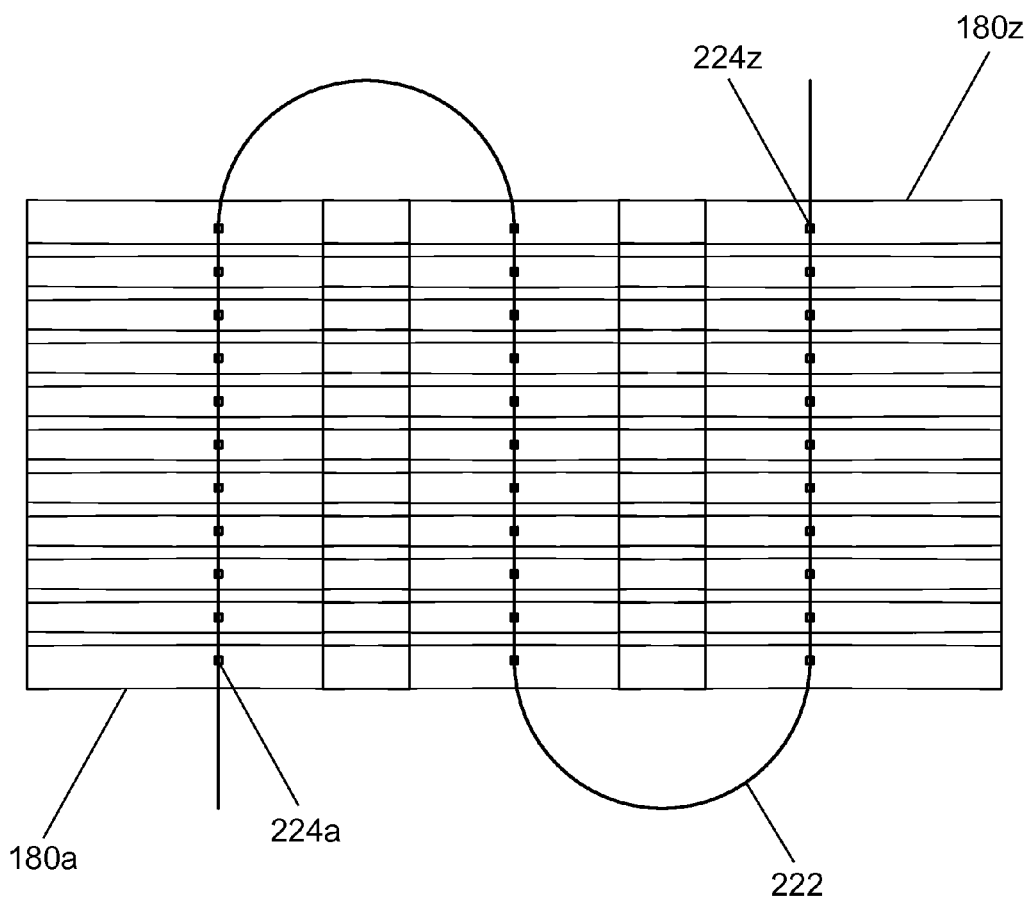
FIG. 19 shows the overlapping aggregate detail fields of view of a succession of shots along three adjacent flight lines.

FIG. 19 shows the overlapping aggregate detail fields of view 180 of a succession of shots along three adjacent flight lines that are part of a typical serpentine flight path 222, i.e. a subset of the flight lines that would make up a typical large-area survey. For clarity the corresponding overview fields of view 170 are omitted. The figure also shows the shot position 224 corresponding to each aggregate detail field of view 180, i.e. the position of the survey aircraft 230.

As already noted, traditional single-resolution aerial surveys are typically operated with 60/40 overlap, i.e. 60% forward (or longitudinal) overlap, and 40% side (or lateral) overlap. With the multi-resolution HyperCamera operated as shown in FIGS. 17 through 19, overview photos are captured with better than 85/40 overlap, and detail photos are captured with only 20/20 overlap at best.

Compared with a traditional single-resolution aerial camera system and a comparable aggregate detail pixel count (e.g. 160 Mpixel), the HyperCamera is between 2 and 3 times more efficient, as detailed below, with respect to both reduced survey flying time and fewer photos to process. The HyperCamera also has a higher efficiency than many aerial camera systems due to its high (detail) pixel count alone.

As an alternative to capturing both overview and detail photos, the HyperCamera can be used to capture detail photos only, with higher overlap (e.g. 60/40 rather than 20/20), to allow the creation of a photomosaic with higher spatial accuracy, but at greater capture and processing cost. In this case the overview camera 112 can be omitted.

To analyse the relative efficiency of a multi-resolution HyperCamera, assume a multi-resolution HyperCamera configuration with a lateral overlap of X %, a longitudinal overlap of Y %, N detail cameras 110, and M overview cameras 112, and for comparison, a single-resolution HyperCamera configuration with lateral overlap of A %, longitudinal overlap of B %, N detail cameras, and no overview camera. Assuming X is smaller than A, the improvement in lateral efficiency, as reflected in a greater flight-line spacing and shorter flying time and fewer detail photos captured, is given by $(1-X)/(1-A)$. Likewise, assuming Y is smaller than B, the improvement in longitudinal efficiency, as reflected in a greater shot spacing and shorter flying time and fewer detail photos captured, is given by $(1-Y)/(1-B)$. The overall improvement in efficiency is given by $(1-X)(1-Y)/(1-A)(1-B)$. This needs to be discounted by the overhead of capturing overview photos, i.e. multiplied by a factor of (N/(N+M)). For X/Y=20/20, A/B=60/40, N=5, and M=1, the net efficiency improvement is 2.2.

The greater efficiency comes at the cost of performing some photogrammetric calculations at the lower resolution of the overview camera 112 rather than at the higher resolution of the detail cameras 110. However, this is at least partially compensated for by the greater overlap between overview photos than in traditional practice.

Figure 20:
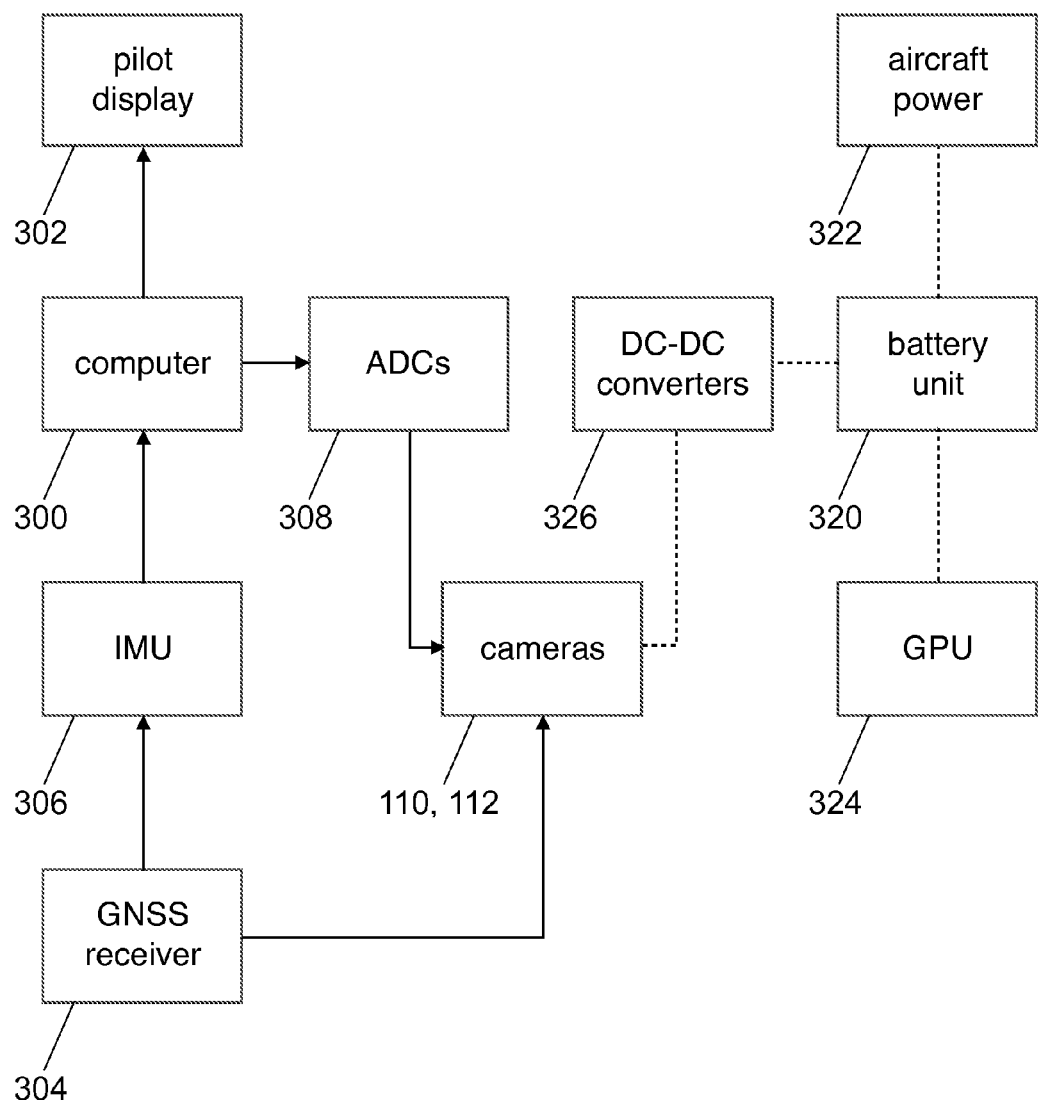
FIG. 20 shows a block diagram of a power and control system for the HyperCamera.

FIG. 20 shows a block diagram of a power and control system for the camera unit 100. The detail cameras 110 and overview camera 112 are controlled by a computer 300 via a set of analog-to-digital converters 308 (ADCs).

The computer 300 uses one or more Global Navigation Satellite System (GNSS) receiver 304 to monitor the position and speed of the survey aircraft 230 in real time. The GNSS receiver(s) may be compatible with a variety of space-based satellite navigation systems, including the Global Positioning System (GPS), GLONASS, Galileo and BeiDou.

The computer 300 provides precisely-timed firing signals to the cameras 110 and 112 via the ADCs 308, to trigger camera exposure, according to a stored flight plan and the real-time position and speed of the aircraft. If a camera 110 and/or 112 incorporates an auto-focus mechanism then the computer 300 also provides a focus signal to each such camera to trigger auto-focus prior to exposure.

The computer 300 fires the overview camera 112 and the detail cameras 110 at the same rate. Alternatively, the computer 300 may fire the overview camera 112 at a different rate to the detail cameras 110, i.e. either a higher rate or lower rate, to achieve a different overlap between successive overview photos, i.e. either a higher overlap or a lower overlap, independent of the overlap between successive detail photos. The computer 300 may fire the cameras simultaneously, or it may stagger the timing of the firing, e.g. to achieve a different alignment of photos longitudinally, or to reduce peak power consumption.

The flight plan describes each flight line making up the survey, and the nominal camera firing rate along each flight line required to ensure that the necessary overlap is maintained between successive shots. The firing rate is sensitive to the elevation of the terrain below the aircraft, i.e. the higher the terrain the higher the firing rate needs to be. It is adjusted by the computer 300 according to the actual ground speed of the aircraft, which may vary from its nominal speed due to wind and the pilot's operation of the aircraft.

The computer 300 also uses the flight plan and real-time GNSS position to guide the pilot along each flight line via a pilot display 302.

As shown in FIG. 20, the position data from the GNSS receiver is optionally augmented with orientation information from an inertial measurement unit 306 (IMU). This allows the computer 300 to provide enhanced feedback to the pilot on how closely the pilot is following the flight plan. In the absence of the IMU 306 the GNSS receiver connects directly to the computer 300.

The computer stores the GNSS position (and optionally IMU orientation, if the IMU 306 is present) of each shot. This is used during subsequent processing of the photos to produce an accurate photomosaic.

Each camera 110 and 112 stores its shots locally, e.g. in removable flash memory. This eliminates the need for centralised storage in the HyperCamera system, and the need for a high-bandwidth data communication channel between the cameras and the centralised storage.

The GNSS position of each shot may be delivered to each camera 110 and 112, to allow the camera to tag each photo with its GNSS position.

The cameras 110 and 112 are powered by a battery unit 320. The battery unit 320 provides a voltage higher than the voltage required by all connected components, e.g. between 24V and 28V, and the voltage requirement of each connected component is provided via a DC-DC converter 326. For example, a Nikon D800 camera requires less than 10V. Additional DC-DC converters 326 also provide appropriate voltages to power the computer 300, the pilot display 302, the GNSS receiver 304, and the IMU 306. For clarity these power connections are omitted in FIG. 20.

The battery unit 320 contains two 12V or 14V batteries or a single 24V or 28V battery. It contains a charging circuit that allows it to be trickle-charged from an aircraft with a suitable auxiliary power source 322, allowing it to remain charged at all times. It may also be charged on the ground from a ground power unit 324 (GPU).

The ADCs 308 and DC-DC converters 326 may be housed in a camera control unit 310 (CCU). This may additionally include a USB interface to allow the computer 300 to control the ADCs.

The DC-DC converters 326 that provide power to the cameras 110 and 112 may be located in the CCU 310 or closer to the cameras in the distribution boxes 150.

Figure 21:
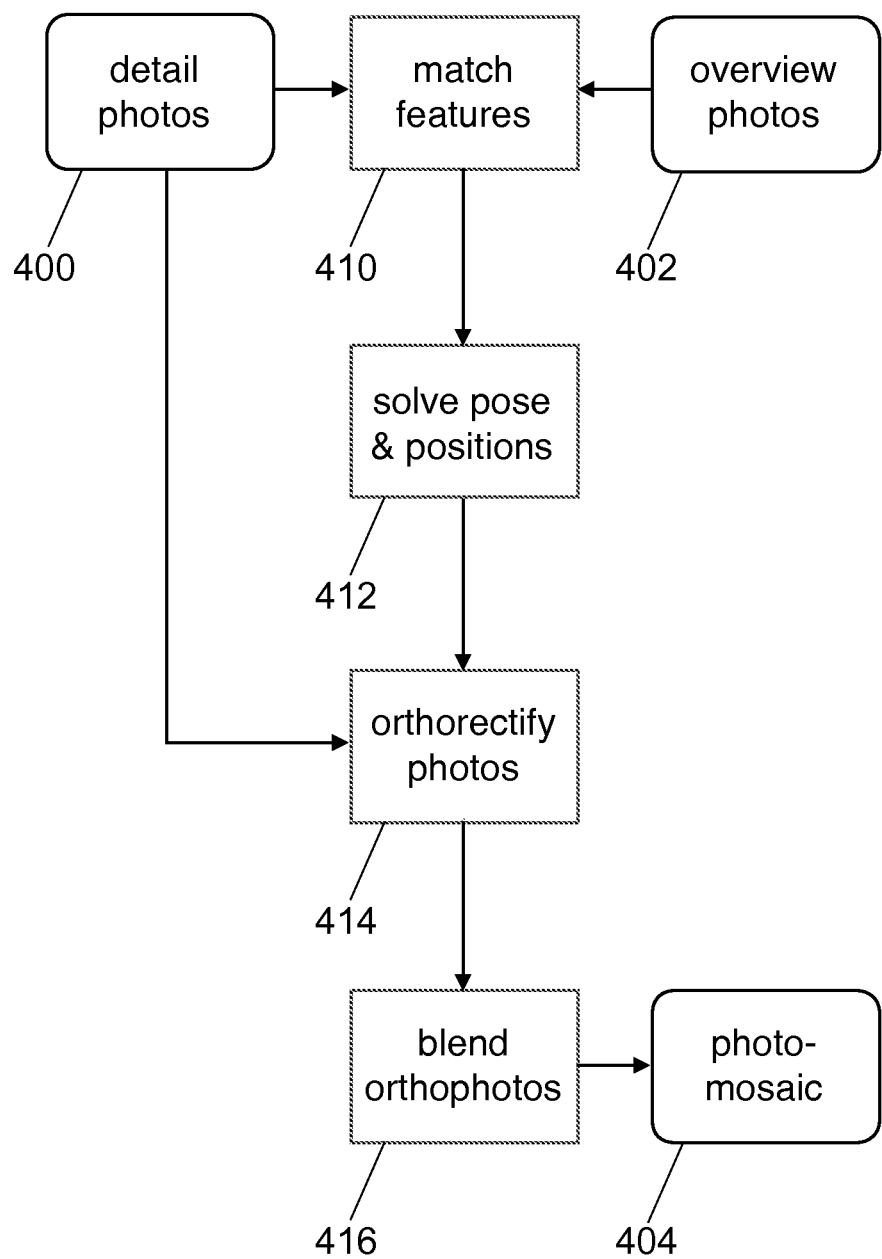
FIG. 21 shows a photogrammetric process flow for efficiently creating a photomosaic from multi-resolution HyperCamera photos.

Photos captured by the HyperCamera are intended to be seamlessly stitched into a photomosaic, and FIG. 21 shows a photogrammetric process flow for efficiently creating a photomosaic from multi-resolution HyperCamera photos. The process operates on detail photos 400 captured by the detail cameras 110, and overview photos 402 captured by the overview cameras 112.

The process consists of four main steps: (1) features are automatically detected in each of the photos 400 and 402 and matched between photos (step 410); bundle adjustment is used to iteratively refine initial estimates of the real-world three-dimensional position of each feature, as well as the camera pose (three-dimensional position and orientation) and camera calibration (focal length and radial distortion) associated with each photo (at step 412); each detail photo 400 is orthorectified according to its camera pose and terrain elevation data (at step 414); and the orthorectified photos (orthophotos) are blended to form the final photomosaic 404 (at step 416).

The accuracy of the photomosaic 404 derives from the high overlap between lower-resolution overview photos 402, while detail in the photomosaic 404 derives from the higher-resolution detail photos 400.

As an alternative, as noted above, a survey may be flown with higher overlap between the detail photos 400, and the photomosaic may be created from the detail photos 400 only.

The photomosaic is typically stored as an image pyramid, i.e. within which different (binary) zoom levels are pre-computed for fast access at any zoom level. Lower zoom levels in the pyramid are generated from higher zoom levels by low-pass filtering and subsampling, thus the entire pyramid may be generated from the detail-resolution photomosaic. As an alternative, lower zoom levels may be generated from a photomosaic created from the overview photos 402, in which case the overview photos 402 are also orthorectified and blended as described above for the detail photos 400.

An initial estimate of the camera pose of each photo, subsequently refined by the bundle adjustment process (at step 412), is derived from the GNSS position of each photo, as well as its IMU-derived orientation, if available.

The terrain data used to orthorectify (at step 414) the detail photos 400 may be based on 3D feature positions obtained from bundle adjustment (at step 412), or may be terrain data sourced from elsewhere (such as from a LiDAR aerial survey).

Automatically detected ground features may be augmented with manually-identified ground points, each of which may have an accurate surveyed real-world position (and is then referred to as a ground control point).

The present invention has been described with reference to a number of preferred embodiments. It will be appreciated by someone of ordinary skill in the art that a number of alternative embodiments of the present invention exist, and that the scope of the invention is only limited by the attached claims.

The invention claimed is:

1. A system for capturing aerial images, the system comprising at least one overview camera, a plurality of detail cameras, and a frame for holding the cameras, each detail camera having a longer focal length than the at least one overview camera, each detail camera mounted at a different angle laterally so that the fields of view of the detail cameras overlap to form an extended lateral field of view, the frame comprising a center support, each side of the center support supporting at least some of the cameras.

2. The system of claim 1, wherein the frame is attachable to the floor of an aircraft above a camera hole, thereby providing the cameras with a view of the ground below the aircraft through the camera hole.

3. The system of claim 2, further comprising an adapter plate attachable to the floor of the aircraft, the frame attachable to the adapter plate.

4. The system of claim 3, wherein the adapter plate attaches to the floor by attaching to seat tracks attached to the floor.

5. The system of claim 1, wherein each detail camera is angled inwards towards the center of the camera hole, thereby minimising the size of the camera hole required to accommodate the fields of view of the detail cameras.

6. The system of claim 1, wherein the ratios of the focal lengths of the detail cameras to the focal length of the at least one overview camera are between 4 and 8.

7. The system of claim 1, wherein the focal lengths of the detail cameras are between 85 mm and 800 mm.

8. The system of claim 1, wherein the focal lengths of the detail cameras are selected from the group comprising: 85 mm, 105 mm, 135 mm, 180 mm, 200 mm, 300 mm, 400 mm, 500 mm, 600 mm, 700 mm, and 800 mm.

9. The system of claim 1, wherein the focal length of the at least one overview camera is between 10 mm and 200 mm.

10. The system of claim 1, wherein the focal length of the at least one overview camera is selected from the group comprising: 10.5 mm, 14 mm, 16 mm, 18 mm, 20 mm, 21 mm, 24 mm, 28 mm, 35 mm, 40 mm, 45 mm, 50 mm, 55 mm, and 60 mm.

11. The system of claim 1, wherein there are five detail cameras.

12. The system of claim 1, wherein at least one detail camera has a fixed-focus lens focused at infinity.

13. The system of claim 1, wherein at least one detail camera has a variable-focus lens and an auto-focus mechanism.

14. The system of claim 1, wherein the at least one overview camera has a fixed-focus lens focused at infinity.

15. The system of claim 1, wherein the at least one overview camera has a variable-focus lens and an auto-focus mechanism.

16. The system of claim 1, further comprising a computer system configured to automatically fire the detail cameras during flight such that successive detail photos overlap longitudinally.

17. The system of claim 16 further comprising at least one Global Navigation Satellite System (GNSS) receiver, the computer configured to receive and store position data from the at least one GNSS receiver in real time.

18. The system of claim 17 further comprising an IMU, the computer configured to receive and store orientation data from the IMU in real time.

19. The system of claim 16 further comprising a pilot display, the computer configured to provide flight instructions to the pilot via the pilot display.

20. The system of claim 16 further comprising a stored flight plan, the computer configured to fire the cameras at a rate determined from the flight plan, the real-time position of the aircraft, and the real-time speed of the aircraft.

* * * * *